(12) United States Patent
Edwards et al.

(10) Patent No.: US 11,420,722 B2
(45) Date of Patent: Aug. 23, 2022

(54) AIRCRAFT FUEL TANK APERTURE SEALING

(71) Applicant: AIRBUS OPERATIONS LIMITED, Bristol (GB)

(72) Inventors: Paul Edwards, Bristol (GB); Antony Peacock, Bristol (GB); Timothy Sanderson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 235 days.

(21) Appl. No.: 16/694,463

(22) Filed: Nov. 25, 2019

(65) Prior Publication Data
US 2020/0164959 A1    May 28, 2020

(30) Foreign Application Priority Data

Nov. 26, 2018 (GB) ...................................... 1819165

(51) Int. Cl.
| | | |
|---|---|---|
| *B64C 3/34* | (2006.01) | |
| *B64C 3/18* | (2006.01) | |
| *B64C 7/00* | (2006.01) | |
| *F16J 15/06* | (2006.01) | |
| *F16J 15/10* | (2006.01) | |

(52) U.S. Cl.
CPC ................ *B64C 3/34* (2013.01); *B64C 3/182* (2013.01); *B64C 3/187* (2013.01); *B64C 7/00* (2013.01); *F16J 15/062* (2013.01); *F16J 15/104* (2013.01)

(58) Field of Classification Search
CPC .. B64C 7/00; B64C 3/34; B64C 3/182; B64C 3/187
See application file for complete search history.

(56) References Cited

U.S. PATENT DOCUMENTS

| | | | |
|---|---|---|---|
| 8,480,030 B2 * | 7/2013 | Stephan | B64C 1/12 244/119 |
| 2016/0355273 A1 * | 12/2016 | Perez Diaz | B64C 3/34 |

FOREIGN PATENT DOCUMENTS

| | | |
|---|---|---|
| EP | 3483073 | 5/2019 |
| GB | 2568258 | 5/2019 |
| WO | 2015/037660 | 3/2015 |

OTHER PUBLICATIONS

Extended European Search Report for European Application No. EP19208657.7, 10 pages, dated Apr. 20, 2020.
Combined Search and Examination Report for GB1819165.0 dated May 23, 2019, 5 pages.

* cited by examiner

*Primary Examiner* — Richard R. Green
*Assistant Examiner* — Ashesh Dangol
(74) *Attorney, Agent, or Firm* — Nixon & Vanderhye P.C.

(57) ABSTRACT

A seal for sealing an aircraft fuel tank, an aircraft wing rib and stringer sealing assembly, an aircraft wing fuel tank, an aircraft structural wing box, an aircraft wing, and a method of sealing an aperture are disclosed. The seal is for sealing a wing rib to a stringer passing through an aperture in the rib at a variable position in the aperture. The seal includes self-adjustment means to absorb any tolerance when forming the seal, upon the stringer being assembled into the aperture in the rib.

16 Claims, 4 Drawing Sheets

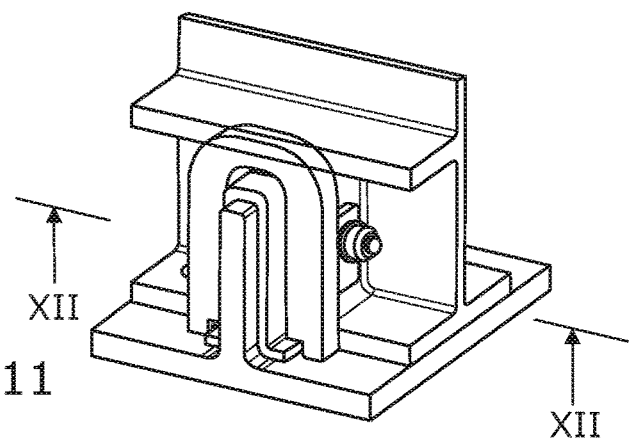
Fig. 11
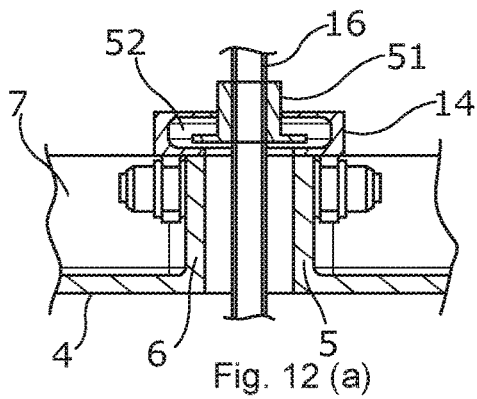
Fig. 12 (a)
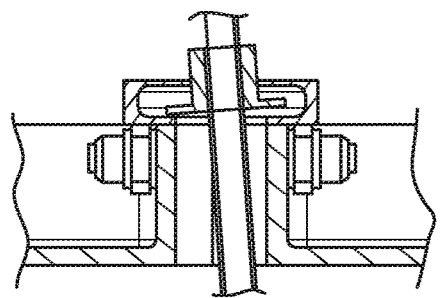
Fig. 12 (b)
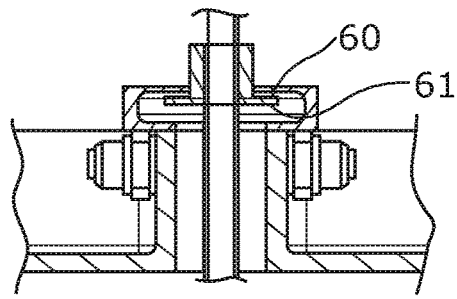
Fig. 12 (c)
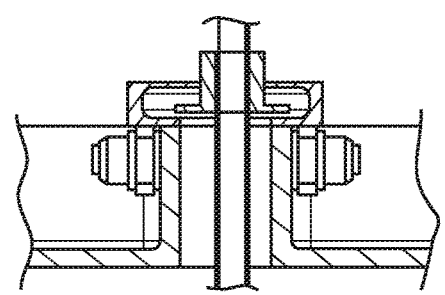
Fig. 12 (d)
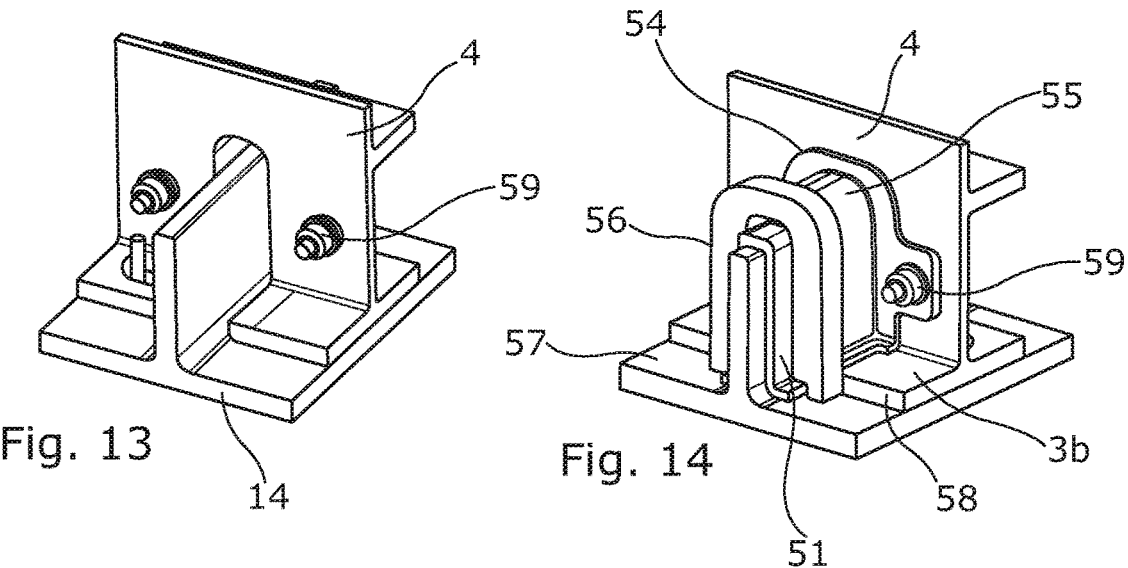
Fig. 13
Fig. 14

AIRCRAFT FUEL TANK APERTURE SEALING

CROSS RELATED APPLICATION

This application claims priority to United Kingdom (GB) Patent Application 1819165.0, filed Nov. 26, 2018, the entire contents of which are hereby incorporated by reference.

FIELD OF THE INVENTION

The present invention relates to an apparatus and method for aircraft fuel tank aperture sealing.

BACKGROUND

Modern aircraft, in particular commercial aircraft, carry fuel in one or more compartments in the fuselage, wing or tailplane. In the wing or tailplane, the fuel is not sealed within a separate internal tank but is housed directly within the structural box of the wing or tailplane. An aircraft wing box traditionally comprises an upper and a lower aerodynamically shaped wing cover separated by front and rear spars and sometimes a central spar for the wing box. Spaced spanwise of the wing are a series of ribs each of which extends horizontally between front and rear spars and vertically between upper and lower covers. The ribs are fastened to both covers and spars whereby to provide all round support for the wing structure. Thus the ribs effectively divide the span of the wing into a series of compartments.

Complication arises with the need to stiffen skins of the wing covers along their length, ie. spanwise. Such stiffeners, normally called stringers, extend spanwise of the wing and each stringer will typically extend through a number of ribbed compartments in the wing and thus cross a number of rib/skin interfaces where the rib is fastened to the skin. In order to allow the stringers to pass the ribs, the ribs define a series of apertures known as "mouseholes" adjacent the wing skin for the stringers to pass through.

If a rib defines a fuel tank boundary, such a mousehole, unless blocked, will allow fuel to pass through the rib, either from one tank to another or to an exterior of a fuel tank. Thus some form of seal will be required to seal the mouseholes.

Mousehole seals, such as plates, are shaped to cover such an aperture formed in a rib where a stringer passes through and are shaped accurately to fit around the profile of the stringer. They are normally individually formed to fit each separate mousehole and are measured, drilled and fitted to the rib at the wing assembly stage. This complex procedure is necessary owing to the stringer being positioned dimensionally within the aperture only to within certain height, longitudinal and lateral positioning tolerances. Final positioning and fastening of the seal plate can therefore only take place when the rib and stringer have been finally assembled together. Such fitting of the seal plates with the wing assembled is extremely time-consuming, creates unwanted drilling swarf and does not allow easy access for drilling or fitting, owing to restricted access within the wing. Working within a wing box is also undesirable from a health and safety perspective. Increased inspection and re-work can also result and the use of CNC drilling machines for the task is unlikely to be possible.

In the manufacture of composite aircraft wings, it is possible to create a structural wing box in two parts. A first part wing box could include a first wing cover, first and second wing spars extending spanwise along the cover and a series of wing ribs spaced spanwise with each extending chordwise between the cover and spars. A second part wing box would then comprise a second cover stiffened by a series of stringers. Mouseholes adjacent the cover of the first wing part can be adequately sealed after the cover and ribs are fastened together. However, mouseholes adjacent the cover of the second part wing box cannot satisfactorily be sealed as the stringers of the second part cannot be assembled into their mousehole apertures until the wing box finally closes. Adjustment of the seals to take account of dimensional tolerance variations in stringer positioning therefore becomes impossible unless manholes are formed in the covers to allow access to the interior of the wing box. Such manholes are highly undesirable for highly stressed composite structures and would increase the weight of the wing box.

An alternative method and apparatus for sealing such mouseholes would therefore be an advantage.

SUMMARY OF THE INVENTION

According to a first aspect of the present invention there is provided a seal for sealing an aircraft wing rib to a stringer passing through an aperture defined in the rib at a position subject to a tolerance, the seal comprising a first seal part engageable with the rib and a second seal part engageable with the stringer, the first and second seal parts each defining a sealing surface for sealable engagement together upon said assembly, and wherein the seal includes self-adjustment means to absorb any said tolerance and form the said seal upon the stringer being assembled into the aperture in the rib.

The apparatus of the invention therefore allows drilling and other machining operations to be carried out to the ribs and sealing apparatus at the component stage as any tolerance mismatches will be automatically absorbed by the first and second seal parts upon assembly. Such machining operations may therefore be carried out more quickly and easily as access is unrestricted. They may also be carried out with greater precision, particularly if CNC machines are used. In addition, as the final seal between the first and second seal parts is made automatically when the first and second wing boxes are assembled together, there is no need to gain access to the wing box post assembly. All other sealing operations, such as between rib and first seal part or stringer and second seal part, may therefore be carried out before the wing box is finally closed.

The self-adjustment means may include a sliding adjuster and may further include camming means to move the sliding adjuster, as first and second seal parts are brought together during assembly.

The first seal part may comprise a seal plate having a body slidably engageable with the rib and defining the sealing surface on a flange depending from the body and the second seal part may comprise a saddle for fitting over an upstanding part of the stringer and define an outwardly directed said sealing surface for engagement with the sealing surface of the seal plate.

The saddle may comprise a pair of downwardly depending legs to engage either side of the stringer and a bridging portion connecting the legs together and may be divided into two parts in a region of the bridging portion whereby to accommodate any variation in thickness of the stringer when positioned thereon.

In order to improve sealing of the aperture, the saddle may include a backing plate to extend across the aperture and into overlapping contact with the rib, when assembled. In addition, the legs and/or the bridging portion may be formed with a second taper shaped to draw the backing plate into sealing contact with the rib as the seal plate is pressed into firm engagement with the saddle, upon assembly.

The saddle, in particular, may comprise slightly flexible or resilient material, more easily to make a seal with the first seal part. The saddle may also be a sliding fit on the stringer, when assembled, to accommodate any positional tolerance of the rib lengthwise of the stringer.

In a preferred embodiment, sealant impregnated foam may be applied to the saddle before assembly takes place.

The camming means may comprise an inwardly extending taper defined on the sealing surface of the saddle and measured in a direction toward the seal plate slidably engageable with a matching taper on the sealing surface of the seal plate whereby to move the sliding adjuster and to facilitate engagement of the sealing surface of the saddle with said matching shape of the sealing surface of the seal plate, upon said assembly.

The seal according to the invention may be used with a metallic wing or a fibre-reinforced composite wing in which ribs, stringers, spars and wing covers may be manufactured all or in part from composite material.

Where design considerations permit, the first or second seal part may comprise composite material.

The seal plate may define one or more slots therein each adapted to receive a fastener attached to the rib therethrough whereby to allow said sliding self-adjustment.

In order to allow a said fastener to be fully tightened, whilst still allowing the fastener to move within the slot, a fastener comprising a bolt or stud may be used which defines a shoulder along its length against which shoulder a nut may be tightened. A length of fastener behind the shoulder may thus be dimensioned to penetrate and hold the first seal part with sufficient stability against the rib to allow said sliding movement but no tilting movement away from the rib.

Said sealing surface of the first seal part may be defined around an arched opening therein, said opening being shaped to receive the second seal part and stringer.

In order to facilitate said assembly, said arched opening may define an outward taper in a direction toward an entrance of the opening. In such a case, the sealing surface on said second seal part will conveniently define a matching taper.

When in the form of a seal plate, the first seal part may define a said sealing surface on a flange depending from the seal plate.

The second seal part may comprise a spacer or packing element shaped to fit over the stringer as a saddle for sealing attachment thereto and to extend between the stringer and first seal part, upon assembly.

The second seal part may comprise two or more elements relatively movable with respect to each other whereby to absorb any dimensional tolerance in the stringer. For example, for a saddle-shaped second seal part having a central bridge element and a pair of legs depending from either end of the bridge, the bridge element may be divided to allow the legs to be spaced apart more or less, according to any dimensional variation in the stringer.

Alternatively or in addition, the second seal part may comprise material with sufficient resilience to absorb any said tolerance mismatch between the rib and stringer or in the stringer itself. Materials having resilience suitable for construction of the second seal part are rubber (perhaps formed-in place as a gasket) or a polymer such as a UV-cured polymer.

The first or second seal part may comprise plastics composite material, in particular where the rib and/or stringer are formed of fibre reinforced plastics composite material which may be deemed structurally compatible.

It will be appreciated that sealant may be used where desired or necessary with the seal of the invention and dimensional allowance will be made accordingly.

In a further embodiment, the first seal part may comprise a frame for attachment to the rib around the aperture, said frame defining an inwardly directed channel therearound, said channel comprising a base and a pair of spaced sidewalls depending therefrom and being arranged for engagement with a sealing element of the second seal part upon assembly.

Said second seal part may comprise a saddle shaped sealably to fit over the stringer, said saddle defining an outwardly projecting said sealing element to engage the first seal part within the said channel thereof upon said assembly.

The outwardly projecting said sealing element may be in the form of a blade and may be dimensioned to fit within the said channel with a clearance sufficient to absorb any said tolerance and optionally to allow the use of sealant.

Said clearance may be formed between a base of the channel and said sealing element to allow relative movement/absorption of any said tolerance between the channel and sealing element in a direction into and out of said channel.

Alternatively or in addition, the outwardly projecting sealing element may be formed narrower than an internal width of the channel, measured between two sidewalls of the channel, whereby to absorb any said tolerance lengthwise of the stringer, when assembled. This may occur, for example, if the second seal part is incorrectly positioned lengthwise of the stringer such that the sealing element enters the channel nearer to one said sidewall than the other.

Another possibility is that the stringer may pass through the first seal part at a slight angle, again requiring the width of the channel between the sidewalls to be greater than a width of the sealing element on the second seal part to absorb any tolerance.

The first seal part may include a body to extend across a rib foot between the frame and a web of the rib, when assembled. If it is desired to seal a base of the channel directly to a base flange of the stringer, this will be difficult if not impossible if a foot of the rib extends into close contact with the stringer web. This embodiment is suitable for rib designs without any horizontal or vertical bracing around the mousehole aperture to which the first seal part may be attached.

According to a second aspect of the present invention there is provided an aircraft wing rib and stringer sealing assembly, the assembly including a said wing rib and at least one stringer sealed together by a seal according to the first aspect.

The assembly may include a said wing rib and stringer and a seal, in which the seal plate defines one or more slots therein each adapted to receive a fastener attached to the rib therethrough, in which the said fastener comprises a bolt or stud penetrating said slot and defining a shoulder a given distance along its length against which shoulder a nut may be tightened, said given distance being a function of a thickness of the seal plate whereby to allow said sliding self-adjustment but optionally no tilting movement of the seal plate away from the rib.

According to a third aspect of the present invention there is provided an aircraft wing fuel tank defined by upper and lower wing covers, front and rear spars, and a pair of spaced ribs sealably attached to the covers and spars by a seal according to the first aspect.

According to a fourth aspect of the present invention there is provided an aircraft structural wing box including at least one wing fuel tank according to the third aspect.

According to a fifth aspect of the present invention there is provided an aircraft wing including a structural wing box according to the fourth aspect.

According to a sixth aspect of the present invention there is provided a method of sealing an aperture, said aperture comprising a mousehole aperture defined between an aircraft wing rib comprised in a first part wing box and a stringer comprised in a second part wing box, said first part wing box including a first wing cover, first and second wing spars extending spanwise along the cover and a series of wing ribs spaced spanwise and each extending chordwise between the cover and spars, said second part wing box comprising a second cover stiffened by at least one said stringer, said stringer being positioned to pass through the mousehole aperture upon assembly of the first and second part wing boxes together, the method including the steps of attaching first and second matching seal parts of a seal according to the first aspect to the rib and stringer, respectively, the seal being adapted to absorb any tolerance between the rib and stringer upon said assembly, and assembling together the first and second part wing boxes whereby to bring into sealing engagement the first and second seal parts.

A method of ensuring that effective mousehole seals are created, upon assembly of two part wing boxes together is therefore provided. The seals are automatically created, upon assembly, and require no fettling, visual checking or later adjustment after the wing box is closed.

BRIEF DESCRIPTION OF THE DRAWINGS

The present invention will now be described, by way of example only, with reference to the following drawings in which:—

FIG. 11 shows the components of FIG. 10 assembled;

FIGS. 12(*a*), 12(*b*), 12(*c*) and 12(*d*) show differing horizontal sectional views taken on the line XII-XII of FIG. 11;

FIG. 13 is an orthographic detail view of an aircraft wing rib and stringer for use in a third embodiment of the invention, and FIG. 14 shows an aircraft wing rib and stringer sealing assembly, according to the third embodiment of the invention.

DETAILED DESCRIPTION OF PREFERRED EMBODIMENT

Figure 15:
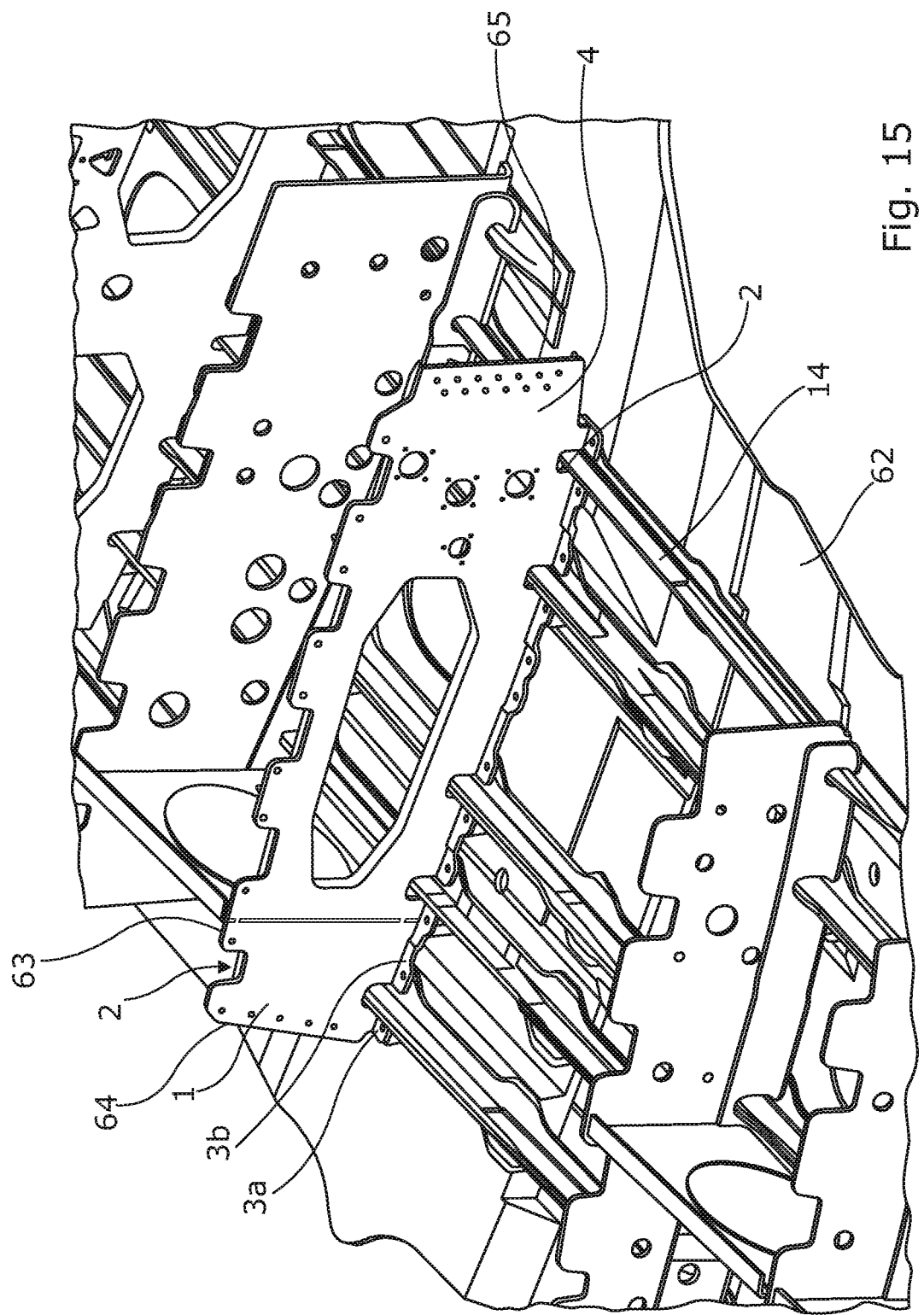
FIG. 15 is an orthographic detail view of an aircraft lower wing cover with ribs attached, according to the prior art.

For ease of understanding, like reference numerals will be used for equivalent features in the drawings. With reference to FIG. 15, according to the prior art and showing the general arrangement of an aircraft wing, a wing lower cover 62 is shown, braced by stringers 14 and ribs 1. Not shown are an upper cover which will be attached to upper edges 63 of the ribs 1 and front and rear spars which will be attached to forward and rear edges of the ribs, respectively. The ribs 1 define "mousehole" apertures 2 therein. The ribs are made of metal but may be made of carbon fibre reinforced composite material. The ribs 1 have rib feet 3*a*, 3*b*, and upstanding webs 4.

Figure 1:
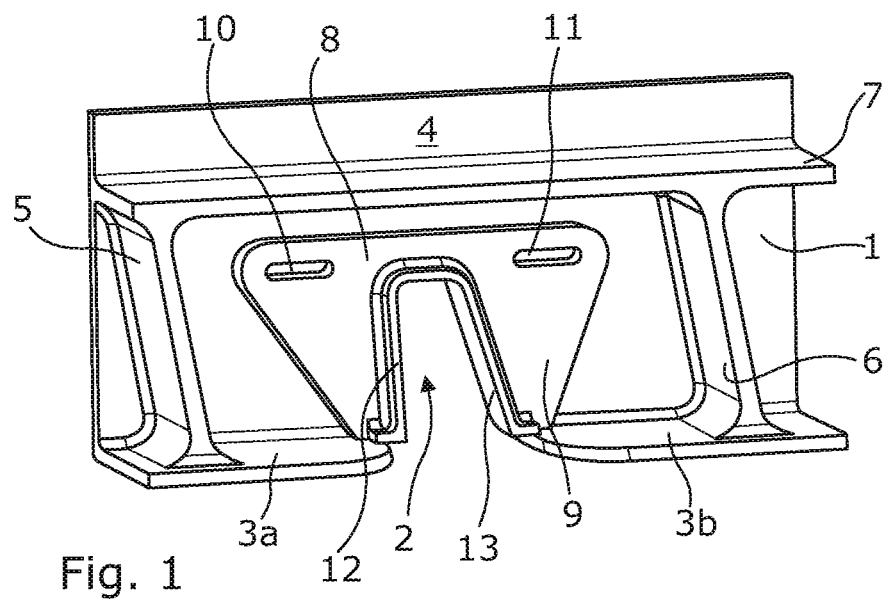
FIG. 1 is an orthographic detail view of an aircraft wing rib and first seal part, according to a first embodiment of the invention.

In FIG. 1, according to the invention, a rib 1 has similar features to those shown in FIG. 15, and in addition two vertical braces 5, 6 and a horizontal brace 7.

Surrounding the aperture 2 is a first seal part in the form of a seal plate 8. The seal plate 8 is here made of fibre reinforced composite material and has a body 9, slots 10, 11 and a flange 12 defining a sealing surface 13 thereon. The seal plate 8 is slidably engageable with the web 4 of the rib 1 to provide sliding adjustment for the seal. In use, sealant is likely to be applied between the body 9 of the seal plate 8 and the web 4 of the rib 1, also onto the sealing surface 13 of the seal plate 8. Sealant may also be required between the saddle 19 and stringer 14.

Shouldered fasteners 41 (see FIG. 4) will be affixed to the rib 1, slidably to secure the seal plate to the rib.

Figure 2:
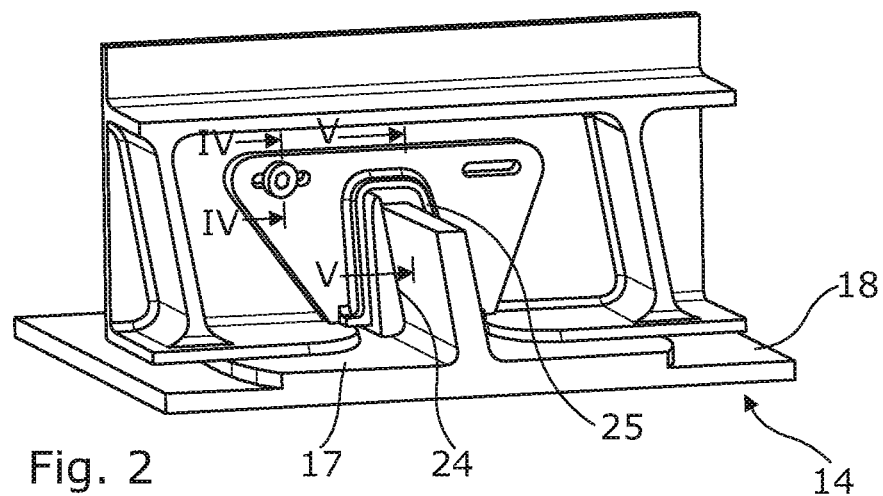
FIG. 2 shows the rib of FIG. 1 assembled with a wing stringer and second seal part to form an aircraft wing rib and stringer sealing assembly according to the invention.
Figure 3:
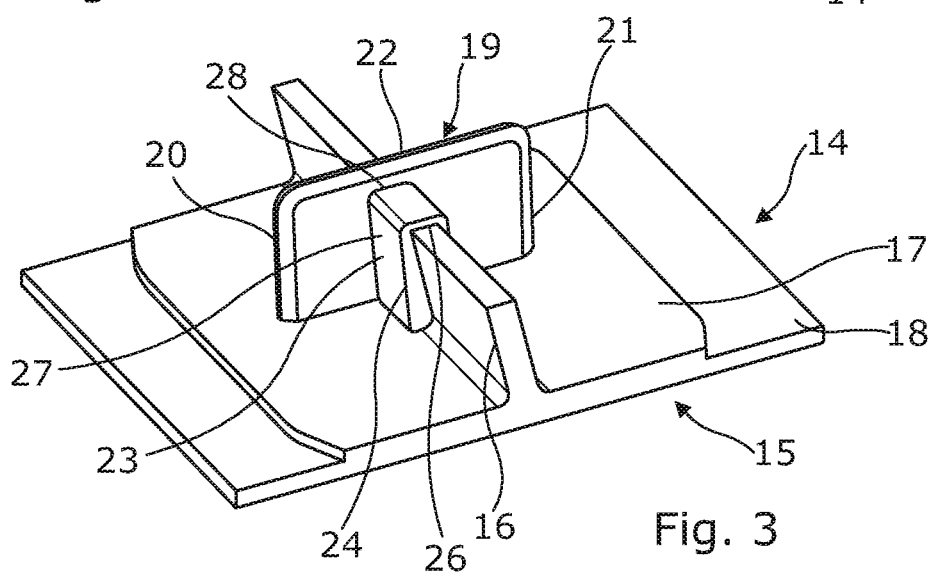
FIG. 3 shows the stringer of FIG. 2 having a second seal part assembled thereon.

With reference to FIGS. 2 and 3, a stringer 14 is shown assembled (in FIG. 2) with the rib 1. The stringer 14 has a tiered base 15 and an upstanding web 16. The tiered base 15 has an upper tier 17 and a lower tier 18. It will be noted that the web 16 of the stringer 14 is upstanding from the base 15 at an angle which is not a right angle. This is a design feature of a particular section of the wing and must be accommodated in the design of the seal.

Shown sitting on the web 16 of the stringer is a split saddle 19. The saddle 19 is also made of composite material but could be rubber or a polymer and comprises two sections 20, 21. The saddle 19 comprises a backing plate 22 and a saddle portion 23. The saddle portion 23 comprises two downwardly depending legs 24, 25 and a bridging portion 26 connecting them together. The legs 24, 25 and bridging portion 26 define an outwardly directed sealing surface 27 thereon for engagement with the sealing surface 13 of the seal plate 8.

In order to accommodate any variation in the thickness of the stringer web 16, the saddle 19 is split along a line 28 in the bridging portion 26. Any small gap thereby formed will be easily sealed with sealant. Liquid sealant may be used on all sealing surfaces but, between sealing surfaces 13 and 27, a sealant impregnated foam (not separately shown) may be used, likely being applied to the sealing surface 27 of the saddle 19.

Sliding self-adjustment of the seal plate 8 with respect to the rib 1 is accomplished, on assembly, by camming means comprising an inwardly extending taper defined on the sealing surface 27 of the saddle 19. The taper on the sealing surface 27 is slidably engageable with a matching taper on the sealing surface 13 of the seal plate 8. In this way, the seal plate 8 is moved along the slots 10 and 11 and engagement of the sealing surface 27 of the saddle 19 with said matching shape of the sealing surface 13 of the seal plate 8 is facilitated, upon assembly of the stringer to the rib.

It can thus be seen that the invention provides sliding adjustment of the seal and thickness adjustment for the stringer, to accommodate dimensional tolerance in both the positioning of the stringer and of its physical dimensions.

Figure 4:
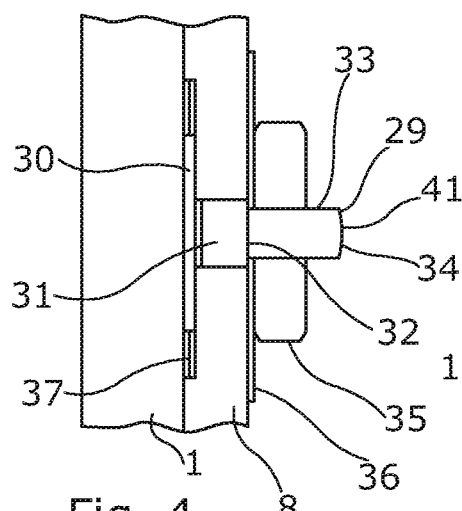
FIG. 4 is a detail part sectional side view taken along the line IV-IV of FIG. 2.

Referring to FIG. 4, a shouldered "sticky" fastener 29 is attached by adhesion of a plate 30 to the rib 1. As an alternative attachment means for the fasteners, a fastener may be riveted on using double countersunk rivets, or bolted on with countersunk rivets. The fastener 29 has a plain portion 31 terminating in a shoulder 32. A threaded portion 33 extends from the shoulder 32 to an end 34 of the fastener.

The plain portion 31 extends through the slot 11 in the seal plate 8. A nut 35 bears against the shoulder 32 via a washer 36. The combined length of the plate and plain portion of the fastener 29 is dimensioned to provide a sliding fit for the seal plate 8 along the slot 11, when bound by the nut 35 and washer 36. The seal plate 8 defines a cutaway 37 therein, co-extending with the slot 11, to receive the plate 30 of the fastener 29.

Figure 5:
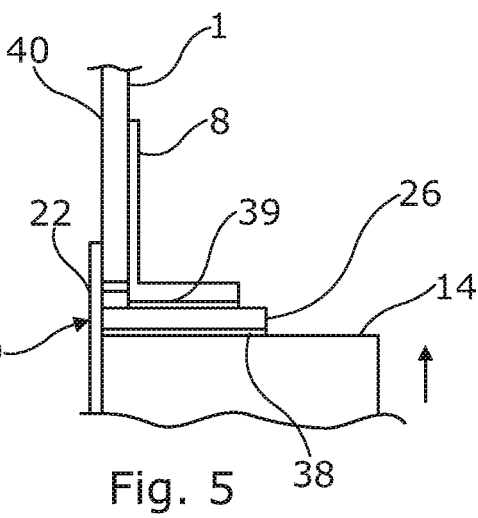
FIG. 5 is a detail side sectional view taken, with slight modification, along the line V-V of FIG. 2.
Figure 6:
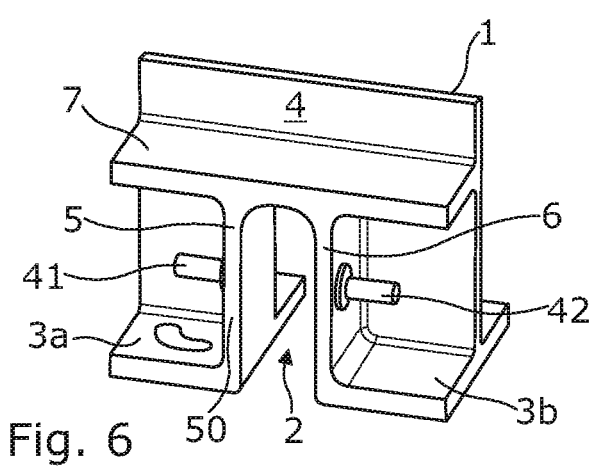
FIG. 6 is an orthographic detail view of an aircraft wing rib for incorporation into a second embodiment of the invention.

Referring to FIG. 5, the stringer 14 is shown fully inserted into the aperture 2 in the rib. It can be seen that the bridging portion 26 of the saddle 19 is also of tapered form, with the bridging portion 26 narrowing toward the backing plate 22. When the stringer 14 is moved in the direction of the arrow into full engagement with the saddle 19 and seal plate 8, during assembly, sealant 38, 39 compressed between the stringer and bridging portion 26 and seal plate 8 and bridging portion 26, respectively, will urge the backing plate 22 of the saddle 19 against a rear surface 40 of the rib 1 and thereby form a stronger seal between the stringer 14 and rib 1.

Referring to FIGS. 6 to 11 of the drawings, in a second embodiment, a rib 1 has an upstanding web 4, rib feet 3a, 3b, a horizontal brace 7 and vertical braces 5, 6. A mousehole aperture 2 is defined between the braces 5, 6 and 7. Attached by adhesive to the vertical braces 5, 6 are "sticky" studs 41, 42.

Figure 7:
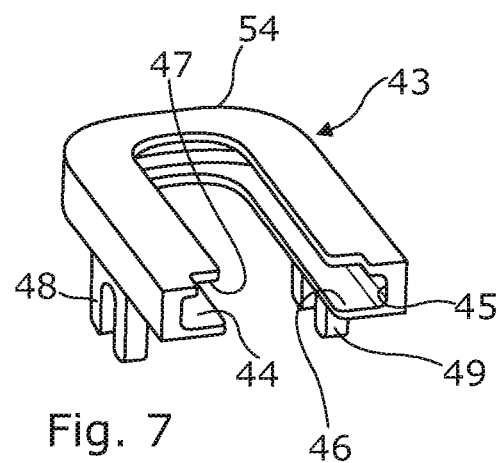
FIG. 7 is an orthographic view of a first seal part, according to the second embodiment of the invention.
Figure 8:
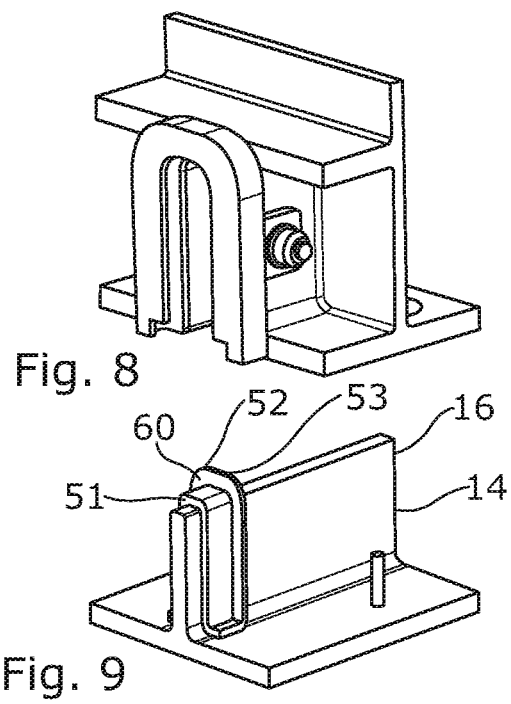
FIG. 8 shows the rib of FIG. 6 and the first seal part of FIG. 7 assembled together.

Referring to FIG. 7, a first seal part in the form of a frame 43 is shown for attachment to the rib 1 around the aperture 2, the frame 43 defines an inwardly directed channel 44 therearound with the channel comprising a base 45 and a pair of spaced sidewalls 46, 47 depending from the base 45. An interior of the channel 44 defines a sealing surface for the first seal part. A pair of slotted brackets 48, 49 engage with the sticky studs 41, 42, respectively, sealably to secure the frame 43 against a sealing face 50 of the rib 1, as shown in FIG. 8. Sealant may be applied to the sealing face 50 to ensure that a seal is formed.

Figure 9:
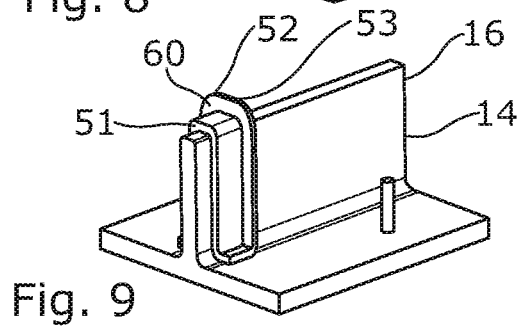
FIG. 9 shows a wing stringer and second seal part for assembly to the rib and first seal part of FIG. 8.
Figure 10:
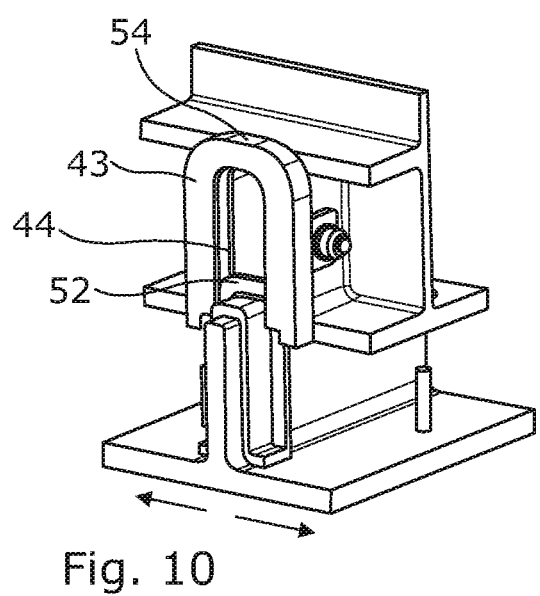
FIG. 10 shows the components of FIGS. 8 and 9 being assembled together.

Referring to FIGS. 9 and 10, a second seal part in the form of a second saddle 51 has a sealing element in the form of an outwardly projecting blade 52. The blade 52 defines opposed sealing surfaces 60, 61 (see FIG. 12c)). As shown in FIGS. 10 and 11, upon assembly of the stringer 14 into the aperture 2, the blade 52 of the second seal part moves progressively into engagement with the channel 44 in the frame 43.

A width of the second saddle 51, taken at an outer extremity of the blade 52, measured across the stringer 14, will normally be less than a distance between opposed bases 45 of the channel 44, thereby giving a degree of relative freedom of movement, laterally of the stringer 14 and in the direction of the arrows shown in FIG. 10, between the blade 52 and channel 44 of the first and second seal parts. This freedom of movement therefore allows the seal to absorb any lateral positional tolerance between the first and second seal parts.

Additionally, an upper extremity 53 of the blade, when fully inserted into the channel 44 of the frame 43, as shown in FIG. 11, is designed not to reach the base 45 of the channel 44 in upper region 54 of the frame. Thus, any dimensional tolerance in height of the stringer 14 can be accommodated by the seal of this embodiment of the invention.

It will be appreciated that the channel 44 will normally be filled with sealant, before assembly, whereupon insertion of the blade 52 into the channel 44 will displace unwanted sealant, leaving the blade 52 sealed to the channel 44. Instead, if it is required only to absorb dimensional tolerance laterally of the stringer rather than longitudinally, a thickness of the blade 52 may be dimensioned to be a close sliding fit between sidewalls 56, 47 of the channel 44 and the use of sealant within the channel may be avoided. It should be noted, however, that sealant will almost certainly be required, for example to seal the frame 43 to the sealing face 50 of the rib 1 or to seal the second saddle 51 to the web of the stringer 14. Thus it is unlikely that sealant would not be used in the channel 44 as well.

Referring now to FIG. 12, FIG. 12a) shows the assembly with the blade 52 of the second saddle 51 positioned nearer to the rib web 4, within the channel 44. This corresponds to the second saddle 51 being positioned on the stringer 14 within tolerance but slightly nearer the rib web 4.

FIG. 12c) shows the blade 52 positioned further from the rib web 4, within the channel 44. This corresponds to the second saddle being positioned within tolerance but slightly further away from the web 4.

FIG. 12b) shows the blade 52 positioned at an angle, across the channel 44. This corresponds to the stringer 14 passing through the aperture 2 at a slight angle to the rib 1.

FIG. 12d) shows the blade 52 positioned both nearer to the web 4 and also nearer to one side of the aperture 2 than the other, within the channel 44. This corresponds to the stringer 14 passing through the aperture 2 slightly off-centre and with the second saddle 51 being slightly nearer the web 4.

The rib configuration so far discussed, with stiffeners around the mousehole, is not universal. FIGS. 13 and 14 show an alternative configuration with no rib mousehole stiffeners. Here, a modified first seal part 54 has a body 55 to extend between a channel 56 and a web 4 of the rib 1 to move the channel 56 away from the web 4 so that the channel 56 is clear of the rib foot 3a, 3b and can contact and be sealed directly to stringer base 57.

In this embodiment, the modified first seal part 54 is fastened to the rib web 4 by fasteners 59. The modified first seal part 54 seals against the second saddle 51, the rib web 4 with a relatively large surface area, also along the rib foot 3a, 3b, against an edge 58 of the rib foot 3a, 3b and against the stringer base 57. Sealant is applied to sealing surfaces as required.

The embodiments described herein are respective non-limiting examples of how the present invention, and aspects of the present invention, may be implemented. Any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined by the accompanying claims.

The word "or" as used herein is to be taken to mean "and/or" unless explicitly stated otherwise.

The invention claimed is:

1. A seal for sealing an aircraft wing rib to a stringer passing through an aperture defined in the rib at a position subject to a tolerance, the seal comprising a first seal part engageable with the rib and a second seal part engageable with the stringer, the first and second seal parts each defining a sealing surface for sealable engagement together upon assembly, wherein the first seal part includes a frame for attachment to the rib around the aperture, said frame comprising a channel disposed about and within an inner periphery of the frame.

2. A seal according to claim 1, in which the first seal part comprises a seal plate having a body slidably engageable with the rib and defining the sealing surface on a flange depending from the body and the second seal part comprises a saddle for fitting over an upstanding part of the stringer and defines an outwardly directed said sealing surface for engagement with the sealing surface of the seal plate.

3. A seal according to claim 2, in which the saddle comprises a pair of downwardly depending legs to engage either side of the stringer and a bridging portion connecting the legs together and is divided into two parts in a region of the bridging portion whereby to accommodate any variation in thickness of the stringer when positioned thereon.

4. A seal according to claim 1, in which the second seal part comprises material with sufficient resilience to absorb any said tolerance between the rib and stringer or in the stringer itself.

5. A seal according to claim 1, wherein said channel comprises a base and a pair of spaced sidewalls depending therefrom and being arranged for engagement with a sealing element of the second seal part upon assembly.

6. A seal according to claim 5, in which said second seal part comprises a saddle shaped sealably to fit over the stringer, said saddle defining an outwardly projecting said sealing element to engage the first seal part within the said channel thereof upon said assembly.

7. A seal according to claim 6, in which the outwardly projecting said sealing element comprises a blade dimensioned to fit within the said channel with a clearance sufficient to absorb any said tolerance.

8. A seal according to claim 7, in which the blade is further dimensioned to allow the use of sealant within the channel.

9. A seal according to claim 7, in which said clearance is formed between the base of the channel and said sealing element to absorb any said tolerance between the channel and sealing element in a direction into or out of said channel.

10. A seal according to claim 7, in which the outwardly projecting sealing element is formed narrower than an internal width of the channel, measured between the two sidewalls thereof, whereby to absorb any said tolerance lengthwise of the stringer, when assembled.

11. A seal according to claim 5, in which the first seal part includes a body to extend across a rib foot between the frame and a web of the rib, when assembled.

12. An aircraft wing rib and stringer sealing assembly including a said wing rib and stringer and a seal according to claim 1.

13. An aircraft wing fuel tank comprising upper and lower wing covers, front and rear spars, and a pair of spaced ribs, said rib being sealably attached to the covers and spars by a seal according to claim 1.

14. An aircraft structural wing box including at least one wing fuel tank according to claim 13.

15. An aircraft wing including a structural wing box according to claim 14.

16. A method of sealing an aperture, said aperture comprising a mousehole aperture defined between an aircraft wing rib comprised in a first part wing box and a stringer comprised in a second part wing box, said first part wing box including a first wing cover, first and second wing spars extending spanwise along the cover and a series of wing ribs spaced spanwise and each extending chordwise between the cover and spars, said second part wing box comprising a second cover stiffened by at least one said stringer, said stringer being positioned to pass through the mousehole aperture upon assembly of the first and second part wing boxes together, the method including the steps of attaching first and second matching seal parts of a seal according to claim 1 to the rib and stringer, respectively, the seal being adapted to absorb any tolerance between the rib and stringer upon said assembly, and assembling together the first and second part wing boxes whereby to bring into sealing engagement the first and second seal parts.

* * * * *